United States Patent
Morlok

(10) Patent No.: US 6,394,920 B1
(45) Date of Patent: May 28, 2002

(54) CONTINUOUSLY VARIABLE TRANSMISSION

(75) Inventor: Tilman Morlok, Rudersberg (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/596,662

(22) Filed: Jun. 19, 2000

(30) Foreign Application Priority Data

Jul. 10, 1999 (DE) .......................... 199 32 339

(51) Int. Cl.$^7$ .................... F16H 59/00; F16H 63/00
(52) U.S. Cl. ............................ 474/28; 474/18
(58) Field of Search .................. 474/18, 28, 64, 474/70, 91; 477/48, 46, 45; 475/206, 210, 317

(56) References Cited

U.S. PATENT DOCUMENTS

| | | | | |
|---|---|---|---|---|
| 4,950,213 A | * | 8/1990 | Morisawa | .................. 475/206 |
| 5,145,464 A | | 9/1992 | Mori | .......................... 474/16 |
| 5,269,726 A | * | 12/1993 | Swanson et al. | ............. 474/28 |
| 5,394,853 A | * | 3/1995 | Teraoka | .................... 474/18 X |
| 5,879,253 A | * | 3/1999 | Friedmann et al. | .......... 474/18 |
| 6,015,359 A | * | 1/2000 | Kunii | .......................... 474/18 |
| 6,190,274 B1 | * | 2/2001 | Walter | ........................ 474/28 |

FOREIGN PATENT DOCUMENTS

| | | | |
|---|---|---|---|
| DE | 42 34 103 | 4/1993 | |
| DE | 195 44 644 A1 | 6/1996 | .......... F16H/59/06 |
| EP | 0 274 080 | 7/1988 | |

OTHER PUBLICATIONS

Röper & Simon, "Die Steuerung des CTX–Getriebes", *ATZ Autmobiltechnische Zeitschrift* 89 (1987) 9; pp. 455–465.

* cited by examiner

Primary Examiner—David A. Bucci
Assistant Examiner—Marcus Charles
(74) Attorney, Agent, or Firm—Davis & Bujold, P.L.L.C.

(57) ABSTRACT

A continuously variable transmission for motor vehicles having a first cone pulley pair and a second cone pulley pair over which runs a belt drive organ. Between the primary pulley (11) and a cover (2) in the transmission housing (1), there is provided for the fluid required to adjust the primary pulley (11), a primary pressure line extending substantially radially toward the center of the rotating primary shaft (12) and from which branches off a lubrication pressure line (8) for the rotating primary shaft (12). The fluid is conveyed between an inner cover (6) and the cover (2).

11 Claims, 2 Drawing Sheets

CONTINUOUSLY VARIABLE TRANSMISSION

The invention concerns a continuously variable transmission.

BACKGROUND OF THE INVENTION

A continuously variable transmission, also called a CVT, has a first cone pulley pair upon an input shaft and a second cone pulley pair upon an output shaft. Each cone pulley pair consists of one cone pulley stationary in the axial direction and one second cone pulley movable in axial direction, called the primary pulley and secondary pulley, respectively. Between the cone pulley pairs extends a belt drive organ, specifically a pushing link band The primary and secondary pulleys are adjusted by a pressure medium. For this purpose, an electronic control unit controls the pressure level of the adjustment spaces of the primary and secondary pulleys via electromagnetic actuators and hydraulic valves.

DE-OS 42 34 103 disclosed a device to control the primary pulley pressure. The device comprises an electromagnetically controlled primary valve and a hydraulic secondary valve. The primary valve is controlled by an electronic control unit. In this known device, in case of an interruption in the line from the electronic control unit to the primary valve, an emergency device is provided, wherein the pressure level of the primary pulley is determined by the secondary valve. The position of the secondary valve, in turn, is determined by the primary pulley via a mechanical coupling.

A process to control a continuously variable transmission has further been described in the *Automobiltechnischen Zeitschrift ATZ*, 1987, volume 89, No. 9, page 455; where both cone pulleys and the power load of two load clutches, working as a starting clutch, are adjusted via hydraulic actuation cylinders, the correct regulation of cylinder prevailing pressure being a function of: the hydraulic control unit, which ensures the belt drive organ is prestressed according to existing motor torque; and the actual ratio, in a manner resulting in a reliable power transmission without band slippage, such that the transmission ratio is adjusted, according to vehicle speed, the driver determined throttle valve position, the accelerator pedal, and the axial force upon the clutch discs is controlled making a smooth and uniform starting operation possible.

Finally, EP-B-274080 describes a continuously variable transmission system to actuate the forward input and reverse input clutches, with a line pressure source, a manual valve device optionally manually movable by the driver in order to convey fluid to the clutches in accordance with the selected driving position, a valve device to produce line control pressure according to a clutch engagement command, and an accumulator which forms a cylinder, with one piston movable therein, one first end being directly connected with the line pressure source and a connection provided with the manual valve device while one second end on the opposite side of the piston is connected with the line control pressure, and can be separated therefrom whereby the selected clutch can be supplied with fluid from the accumulator of the line pressure source.

In the continuously variable transmissions known already, not only is the primary pressure needed to adjust the primary pulley, but also a lubrication pressure must be fed to the rotating primary shaft, which is firmly connected with the primary pulley. The lubrication supply pressure and primary pressure requires adequate feed lines which must have sufficient cross sections, the primary pressure requiring a minimum cross section of about 80 $mm^2$ and the lubrication pressure a cross section of at least about 30 $mm^2$. This results in an accordingly large axial length and many problems are involved in keeping the minimum cross section dimensions.

SUMMARY OF THE INVENTION

The problem on which this invention is based is to provide a continuously variable transmission of reduced axial length and yet sufficient cross sections to ensure the supply of primary pressure and lubrication pressure.

Based on a transmission of the type specifically mentioned above, this problem is solved with the disclosed features.

Therefore, the invention provides that in the housing, between the primary pulley and the housing cover, there is disposed, extending substantially radially toward the center of the rotating primary shaft, a primary pressure line for the fluid required to adjust the primary pulley, which discharges in an inner cover. This ensures sealing between the cover and primary shaft. A lubrication pressure line is also provided for the rotating primary shaft.

The invention thus offers the advantage of a reduced axial length, since the primary pressure is now fed between the inner cover and the housing cover to the center of the shaft, and no longer via a hole inside the transmission cover, whose diameter must have a dimension of at least 10 mm to achieve the above indicated minimum cross section values.

According to the invention, sufficient cross sections are ensured by the fact that lubrication pressure is now conveyed within the primary pressure.

BRIEF DESCRIPTION OF THE DRAWINGS

The invention is explained below in detail with the aid of drawings which show an advantageous embodiment. The drawings show.

DESCRIPTION OF THE PREFERRED EMBODIMENTS

Figure 1:
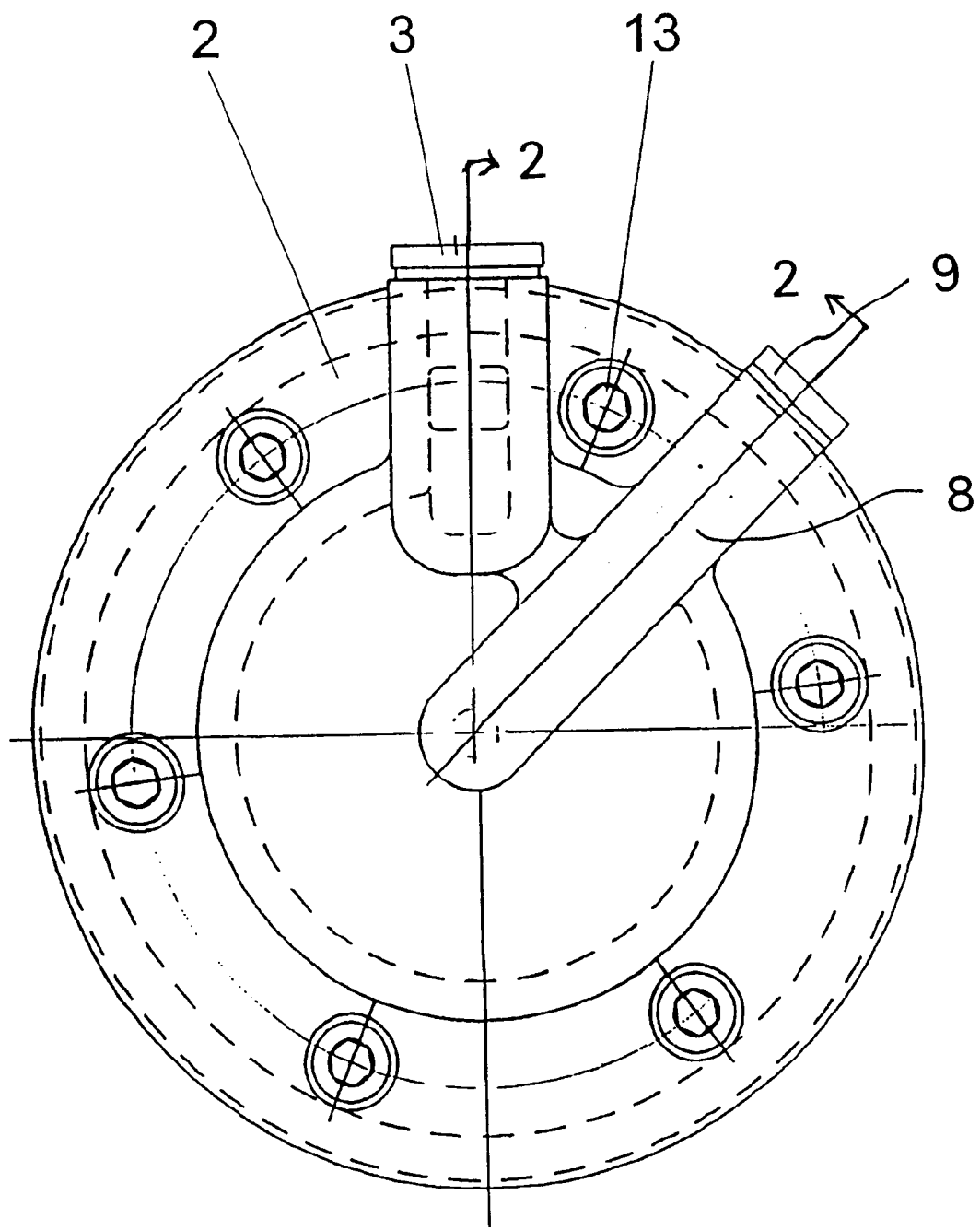
FIG. 1 is a top view on the cover-side end of a continuously variable transmission.
Figure 2:
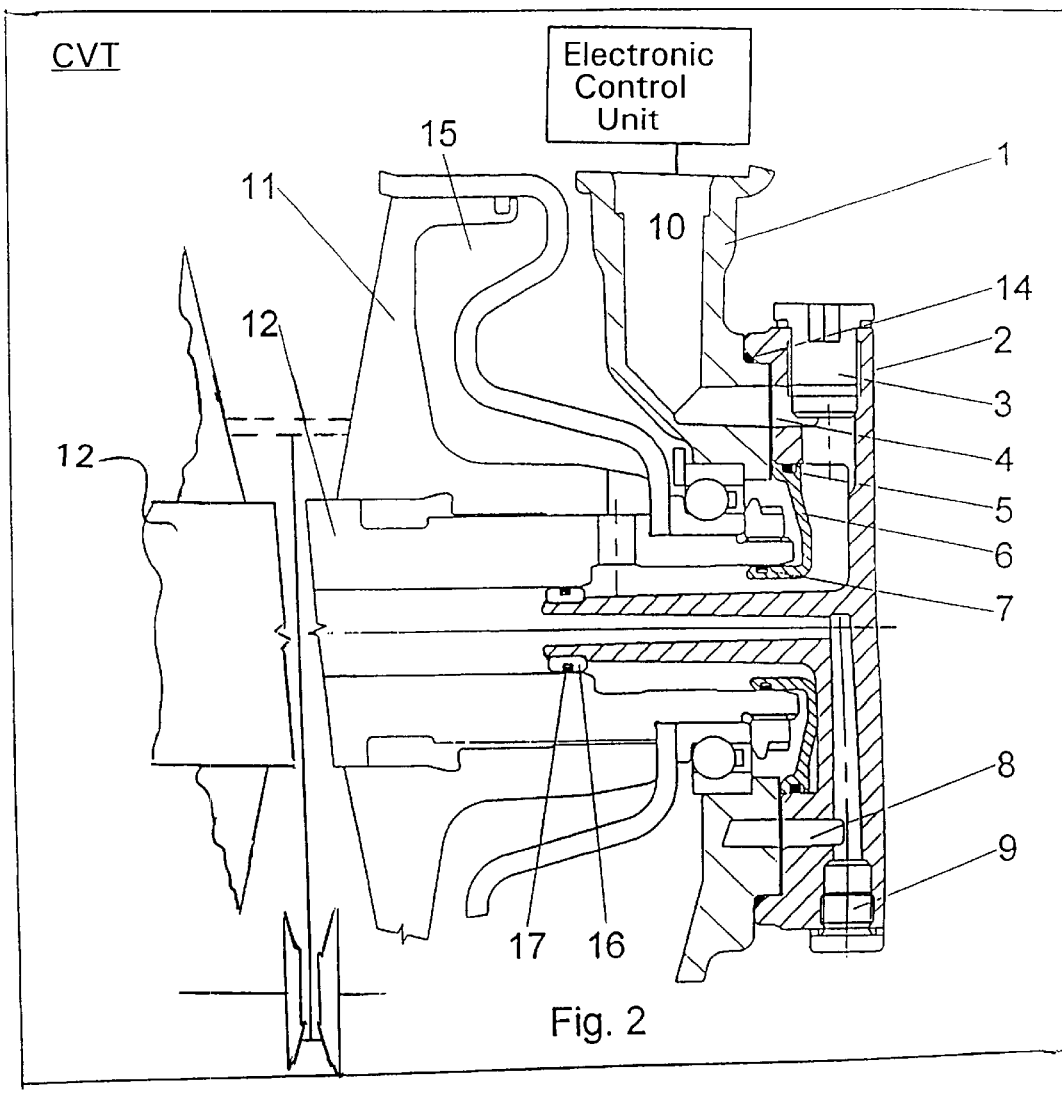
FIG. 2 is a section through the end of the continuously variable transmission facing the cover.

In the Figures, in which the same reference numerals have been given to the same parts, only the parts needed for understanding the invention have been provided with reference numerals. Thus is designated one part for the housing 1 of the continuously variable transmission, the primary pulley 11 with one cone pulley pair, and the rotating primary shaft 12, upon which the primary pulley 11 is firmly situated. The primary shaft 12 extends proximal to an opening which is closed by cover 2.

According to the invention, there is provided in housing 1 a primary pressure line 10, extending substantially radial with the center of the rotating primary shaft 12, and through which the fluid flows up to inner cover 6, to adjust primary pulley 11; in addition, a lubrication pressure line 8 is provided for the rotating the primary shaft 12.

A locking screw 3, a gasket 4, an O-shaped sealing ring 5, a rectangular sealing ring 7, another locking screw 9, fixing bolts 13, another O-shaped sealing ring 14, a bushing 16 and another rectangular sealing ring 17 are also designated.

The seal between housing 1 and cover 2 is implemented by gasket 4 and O-shaped sealing ring 14. The O-shaped sealing ring 5 seals inner cover 6 against cover 2 while rectangular sealing ring 7 seals inner cover 6 against the rotating primary shaft 12. On account of the relative movement of rectangular sealing ring 7 in the rotating seal, steel proves to be the favorable material for inner cover 6, but alternative materials, e.g. an aluminum alloy with high Si content can be considered.

The lubrication pressure line 8 is sealed relative to the rotating primary shaft by bushing 16, preferably designed as a steel bushing, which is pressed upon cover 2 and rectangular sealing ring 17. When an adequate material with a high Si portion, such as cast aluminum, has been selected for cover 2 bushing 16 may be eliminated, and rectangular sealing ring 17 directly situated in a corresponding groove on cover 2.

The primary pressure, therefore, is conveyed through primary pressure line 10, between inner cover 6 and cover 2, toward the center of rotating primary shaft 12, and not via a hole having a minimum diameter of 10 mm within cover 2 as had hitherto been customary, and into adjustment space 15 of primary pulley 11. The lubrication pressure is also conveyed within the primary pressure through lubrication pressure line 8, and conveyed to the center of the shaft of primary shaft 12.

A shorter transmission axial length is thus ensured while, at the same time, maintaining minimum cross section dimensions in the primary pressure line and in the lubrication pressure line.

REFERENCE NUMERALS 1 housing
2 cover
3 locking screw
4 gasket
5 O-seal
6 inner cover
7 rectangular seal
8 lubrication pressure line
9 locking screw
10 primary pressure line
11 primary pulley
12 primary shaft
13 bolts
14 O-seal
15 adjustment space
16 bushing
17 rectangular seal

What is claimed is:

1. A continuously variable transmission for motor vehicles comprising:
   a hollow primary shaft;
   a first cone pulley pair located on the primary shaft and the first cone pulley pair having a stationary primary pulley and a movable primary pulley which is movable in an axial direction relative to the stationary primary pulley by a pressurize medium supplied to an adjustment space of the movable primary pulley for moving the movable primary pulley toward the stationary primary pulley;
   a housing supporting the primary shaft and the first cone pulley pair, and the housing having an opening sealed by a removable cover;
   an electronic control unit for determining a pressure level of a pressure medium supplied to the adjustment space of the movable primary pulley;
   a projection, provided on an inwardly facing surface of the removable cover, communicating with a hollow end of the primary shaft located adjacent the removable cover, and the projection has a conduit extending therethrough;
   a primary pressure line extending substantially radially toward a center of the primary shaft to supply the pressure medium to an inner cover which facilitates with supplying the pressure medium along an exterior surface of the projection of the removable cover to the adjustment space of the movable primary pulley; and
   the conduit of the projection of the removable cover communicates with a lubrication line to supply a lubricating pressure medium to the hollow primary shaft.

2. The continuously variable transmission according to claim 1, wherein a central inner shaft of the primary shaft has a first region with a first inner diameter and a second region with a second inner diameter, and the diameter of the first inner region is greater than the diameter of the second inner region.

3. The continuously variable transmission according to claim 2, wherein a bushing couples a remote end of the projection of the outer cover to the second region of the central inner shaft of the primary shaft.

4. The continuously variable transmission according to claim 3, wherein the inner cover is secured adjacent the first region of the central inner shaft of the primary shaft so as to form a gap between the projection of the outer cover and the first region of the central inner shaft of the primary shaft and facilitate flow of the pressure medium to the adjustment space for adjusting the primary pulley along the exterior surface of the projection of the removable cover.

5. The continuously variable transmission according to claim 1, wherein the primary pressure line extends substantially radially toward the center of the primary shaft prior to contacting with the exterior surface of the projection of the removable cover.

6. A continuously variable transmission for motor vehicles comprising:
   a hollow primary shaft;
   a first cone pulley pair located on the primary shaft and the first cone pulley pair having a stationary primary pulley and a movable primary pulley which is movable in an axial direction relative to the stationary primary pulley by a pressurize medium supplied to an adjustment space of the movable primary pulley for moving the movable primary pulley toward the stationary primary pulley;
   a secondary shaft;
   a second cone pulley pair located on the secondary shaft and the secondary cone pulley pair having a stationary secondary pulley and a movable secondary pulley which is movable in an axial direction relative to the stationary secondary pulley by a pressurize medium supplied to an adjustment space of the movable secondary pulley for moving the movable secondary pulley toward the stationary secondary pulley;
   a belt drive coupled to both of the first and second cone pulley pairs for supplying drive from the first cone pulley pair to the second cone pulley pair;
   a housing supporting the primary shaft and the first cone pulley pair and the secondary shaft and the second cone pulley pair, and the housing having an opening sealed by a removable cover;
   an electronic control unit for determining a pressure level of a pressure medium supplied to the adjustment space of the movable primary pulley and the adjustment space of the movable secondary pulley;

a projection, provided on an inwardly facing surface of the removable cover, communicating with a hollow end of the primary shaft located adjacent the removable cover, and the projection has a conduit extending therethrough;

a primary pressure line extending substantially radially toward a center of the primary shaft to supply the pressure medium to an inner cover which facilitates with supplying the pressure medium axially along an exterior surface of the projection of the removable cover to the adjustment space of the movable primary pulley; and the conduit of the projection of the removable cover communicates with a lubrication line to supply a lubricating pressure medium to the hollow primary shaft.

7. The continuously variable transmission according to claim 6, wherein a central inner shaft of the primary shaft has a first region with a first inner diameter and a second region with a second inner diameter, and the diameter of the first inner region is greater than the diameter of the second inner region.

8. The continuously variable transmission according to claim 7, wherein a bushing couples a remote end of the projection of the outer cover to the second region of the central inner shaft of the primary shaft.

9. The continuously variable transmission according to claim 8, wherein the inner cover is secured adjacent the first region of the central inner shaft of the primary shaft so as to form a gap between the projection of the outer cover and the first region of the central inner shaft of the primary shaft and facilitate flow of the pressure medium to the adjustment space for adjusting the primary pulley along the exterior surface of the projection of the removable cover.

10. The continuously variable transmission according to claim 9 wherein the primary pressure line extends substantially radially toward the center of the primary shaft prior to contacting with the exterior surface of the projection of the removable cover.

11. A continuously variable transmission for motor vehicles comprising:

a hollow primary shaft;

a first cone pulley pair located on the primary shaft and the first cone pulley pair having a stationary primary pulley and a movable primary pulley which is movable in an axial direction relative to the stationary primary pulley by a pressurize medium supplied to an adjustment space of the movable primary pulley for moving the movable primary pulley toward the stationary primary pulley;

a housing supporting the primary shaft and the first cone pulley pair, and the housing having an opening sealed by a removable cover;

an electronic control unit for determining a pressure level of a pressure medium supplied to the adjustment space of the movable primary pulley;

a projection, provided on an inwardly facing surface of the removable cover, communicating with a hollow end of the primary shaft located adjacent the removable cover, and the projection has a conduit extending therethrough;

a primary pressure line extending substantially radially toward a center of the primary shaft to supply the pressure medium to an inner cover which facilitates with supplying the pressure medium axially between a radially inward facing surface of the inner cover and the projection of the removable cover to the adjustment space of the movable primary pulley; and the conduit of the projection of the removable cover communicates with a lubrication line, without communicating with the adjustment space of the movable primary pulley, to supply a lubricating pressure medium slowly to the hollow primary shaft.

* * * * *